(No Model.)

R. A. GAILBREATH.
MEAT TENDERER.

No. 502,355. Patented Aug. 1, 1893.

Witnesses
John C. Shaw

Inventor
Robert A. Gailbreath
By his Attorneys,
C. A. Snow & Co.

UNITED STATES PATENT OFFICE.

ROBERT A. GAILBREATH, OF NEAR LOUISVILLE, KENTUCKY.

MEAT-TENDERER.

SPECIFICATION forming part of Letters Patent No. 502,355, dated August 1, 1893.

Application filed March 27, 1893. Serial No. 467,874. (No model.)

*To all whom it may concern:*

Be it known that I, ROBERT A. GAILBREATH, a citizen of the United States, residing near Louisville, in the county of Jefferson and State of Kentucky, have invented a new and useful Meat-Tenderer, of which the following is a specification.

My invention relates to improvements in meat tenderers, and my object is to provide a device of the class named by means of which the fiber of the meat may be crushed and broken without cutting or severing the same.

A further object of my invention is to provide adjustable means for cleaning the crushers or breakers or freeing the teeth thereof from clinging particles.

A further object of my invention is to provide means for readily disconnecting the parts of the machine for the purpose of thoroughly cleansing the crushers or breakers.

Further objects and advantages of my invention will appear in the following description, and the novel features thereof will be particularly pointed out in the appended claims, which claims should be construed in the light of the state of the art and the existing law.

Figure 1:
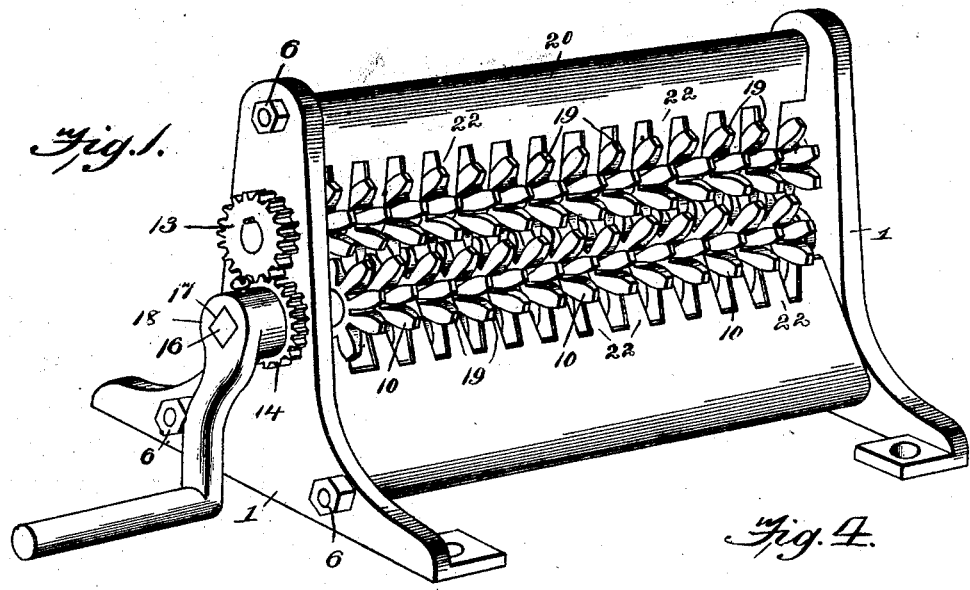
Figures 2, 4, 5:
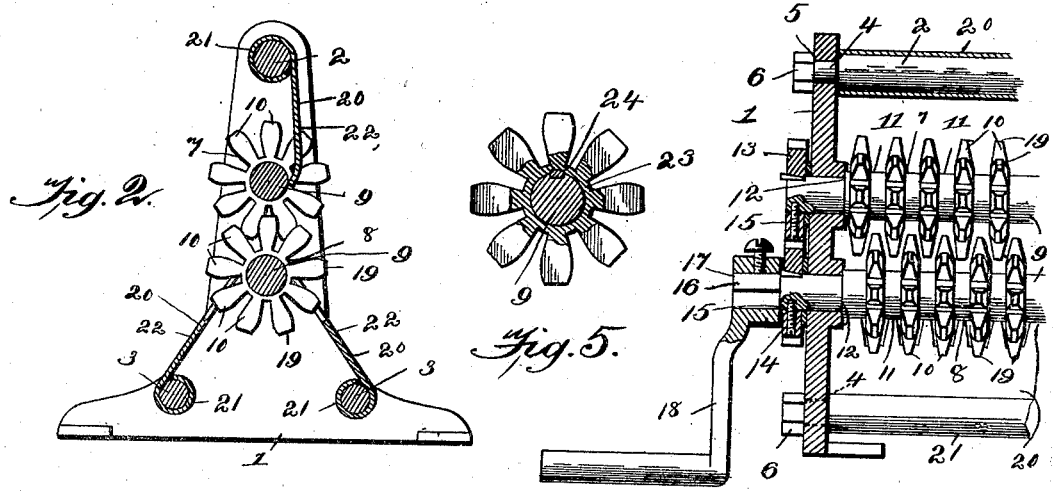
Figure 3:
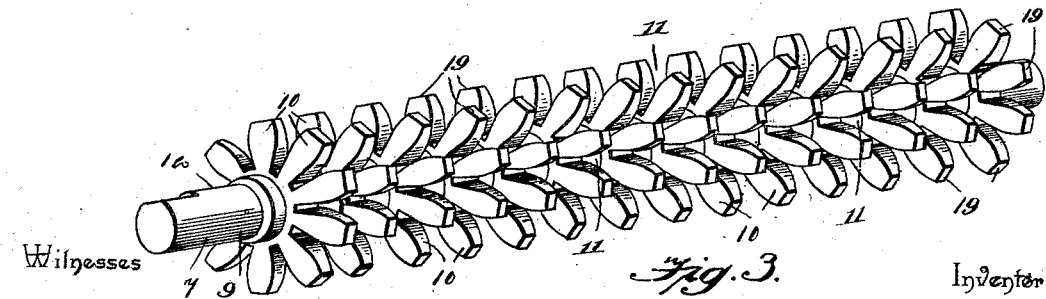

In the drawings: Figure 1 is a perspective view of a machine embodying my invention. Fig. 2 is a transverse vertical section of the same. Fig. 3 is a detail view, in perspective, of one of the toothed rolls. Fig. 4 is a vertical sectional view of one end of the machine to show the bearings, &c., for the rolls. Fig. 5 is a detail sectional view to show a modified manner of forming the teeth and attaching them to the shafts.

Similar numerals of reference indicate corresponding parts in all the figures of the drawings.

The supporting frame, for the operating members of my improved machine, comprises the vertical end plates, 1, connected by the horizontal, longitudinally-disposed cylindrical bars, 2, arranged near the bases of said plates, and the similar bar, 3, connecting the upper ends of the plates. These bars, 2 and 3, are reduced at their extremities and provided with shoulders, 4, to bear against the inner surfaces of the end-plates, their reduced and threaded terminals being extended through registering perforations, 5, in the plates and engaged at the outer sides of the latter by taps, 6.

The crushing or breaking rolls, 7 and 8, respectively, consist, each, of a central, cylindrical core, 9, from which project spaced series of radially-disposed teeth, 10, which are preferably formed integral with the core. The intervals, 11, between adjacent series of teeth are, at the surface of the core, equal in width to the width of the teeth at their bases, and the teeth are tapered in width from their bases toward their free ends by beveling their opposite sides equally. The series of teeth carried by one of the rolls operate between and out of contact with the series of teeth carried by the other roll, or in the intervals between such series, and the teeth terminate short of the surface of the core of the other roll so as to avoid completely puncturing the interposed meat. The cores of the rolls are reduced at their ends to form trunnions, 12, which are mounted in bearings in the end-plates of the frame and are extended beyond one of the end-plates. The intermeshing spur-gears, 13 and 14, are feathered upon these extensions of the trunnions of the cores, and are firmly secured thereto by means of set-screws, 15. The trunnion of the lower roll, 8, is extended beyond the outer surface of its gear to form an angular post, 16, upon which is fitted the socket, 17, of the crank, 18.

As above described, the teeth, 10, are tapered in width toward their terminals, which terminals are blunt or abrupt to form the rectangular crushing surfaces, 19, and the edges of the teeth, or those surfaces which are adjacent to each other in series, are approximately parallel, whereby the thickness of the teeth, measured parallel with the circumference of the core, is the same at their terminals as at their bases, as will be clearly seen by reference to Fig. 2, of the drawings. I do not form the opposite edges of a tooth exactly parallel, however, for a purpose which will be hereinafter explained, but form the same rounded or convex, whereby the distance between the edges at a point intermediate between the base and the terminal is greater than at the base or terminal. Thus each tooth increases regularly or evenly in width toward its base, and increases somewhat abruptly in thickness to a point intermediate between the terminal and the base.

From the above it will be understood that by the "width" of a tooth I mean the measurement thereof taken parallel with the axis of the roll, and by the "thickness" thereof I indicate the measurement taken circumferentially, or at a tangent to the surface of the core.

The advantage derived from the peculiar formation of the tooth is that thereby the fibers of the meat are more effectively crushed and broken without tearing the meat into shreds. The bulging or convexing of the edges of the teeth prevents them from puncturing the meat too deeply.

In connection with my machine I employ shields, 20, which in the construction illustrated are formed of sheet metal and are bent upon themselves at their outer edges to form integral tubular sleeves, 21, which fit and are rotatably mounted upon the cylindrical connecting bars, 2 and 3. The inner edges of these shields are provided with integral fingers, 22, which are spaced to correspond with the intervals between the series of teeth carried by the rolls, and project between such series to lie at their extremities upon the surfaces of the cores and ride loosely thereon. The fingers are tapered in width, from their bases to their terminals to correspond with the taper of the teeth carried by the rolls, whereby the edges of the fingers are in close proximity to the adjacent side surfaces of the teeth, throughout. These shields are pivotally mounted in operative relation to the rolls to enable them to be folded outward, out of contact with the rolls to enable the latter to be cleaned. The fingers are slightly curved toward the cores at their extremities to lie in close contact therewith, whereby the particles of meat are scraped from the cores and discharged into a suitable receptacle. Two of the shields are arranged upon the delivery side of the machine to act as cleaners, as above described, and the third shield is arranged upon the receiving side of the machine, in operative relation to the lower roll, to guide the meat between the rolls. It will be observed that the upper shield is pivotally connected to the frame above the upper roll whereby its fingers are held in contact with the core of the latter by gravity, and the duplicate lower shields are also pivotally connected to the frame below the plane of the lower roll and incline inwardly toward their free edges to preserve contact with the core of the roll by gravity, thus avoiding the necessity of springs or other retaining devices.

Fig. 5 shows a modified form of attaching the teeth or breakers in which they are formed integral in series with central rings 23 which are fitted upon the shafts, shown at 9 in said figure, and held in place by means of keys 24. This is a preferable construction as it is believed to be cheaper than that in which the teeth are formed integral with the shaft or are secured thereto in any other manner.

Having thus described my invention, what I claim, and desire to secure by Letters Patent, is—

1. In a machine of the class described, the combination with a supporting frame, intermeshing toothed rolls rotatably mounted in said frame, and means for operating the same, of shields pivotally mounted upon the frame parallel with the rolls and provided with fingers to intermesh with the teeth thereof, substantially as specified.

2. In a machine of the class described, the combination with a supporting frame having horizontal parallel cylindrical bars, intermeshing toothed rolls rotatably mounted in the frame parallel with said bars, and means for operating the rolls, of pivotal shields mounted upon said bars and having fingers to intermesh with the teeth of the rolls, substantially as specified.

3. In a machine of the class described, the combination with the supporting frame, the toothed rolls, and means for operating the same, of an upper shield pivotally connected to the supporting frame at a point above the upper roll and provided at its free lower edge with fingers which intermesh with the teeth upon the roll and are held in the operative position by gravity, and duplicate lower shields, pivotally connected to the supporting frame below the plane of the lower roll and incline inwardly toward their upper edges, said lower shields being provided with fingers which intermesh with the teeth of the lower roll, substantially as specified.

4. In a machine of the class described, the toothed rolls and means for operating the same, each roll consisting of a core and spaced series of radially-disposed teeth, the intervals between adjacent series of teeth being equal to the width of the bases of the teeth, and the teeth being tapered in width toward their terminals, substantially as specified.

5. In a machine of the class described, the co-acting toothed rolls and means for operating the same, said rolls being provided with spaced alternately-disposed series of radial teeth having abrupt or flat terminals, the teeth of each roll terminating short of the bases of the teeth of the coacting roll, substantially as specified.

6. In a machine of the class described, the co-acting toothed rolls provided with teeth having beveled sides and approximately parallel edges and terminate in abrupt flat ends which are elongated in the direction of tangents of the rolls, substantially as specified.

7. In a machine of the class described, the coacting rolls provided with radial teeth the edges of which are rounded or convexed, whereby they are tapered in thickness toward their extremities and toward their bases, substantially as specified.

8. In a machine of the class described, the co-acting toothed rolls, each comprising a shaft, rings fitted upon said shaft, radial teeth integral with said ring, and securing devices between the rings and the shaft, and means for operating said rolls, substantially as specified.

In testimony that I claim the foregoing as my own I have hereto affixed my signature in the presence of two witnesses.

ROBERT A. GAILBREATH.

Witnesses:
L. A. STALLARD,
C. S. GAILBREATH.